United States Patent Office 2,758,132
Patented Aug. 7, 1956

2,758,132

NITRATION OF CARBAMATE ESTERS

George R. Thomas, Brookline, Mass.

No Drawing. Application April 30, 1954,
Serial No. 426,899

15 Claims. (Cl. 260—482)

This invention relates to the preparation of compounds of the type $>N-NO_2$, and more particularly to the nitration of substituted carbamic acid esters.

The prior art teaches that substituted carbamates have been nitrated (a) by absolute nitric acid, usually at 0° C. and using a 320–1700% excess of nitric acid (b) by fuming nitric acid and acetic anhydride using a 50–348% excess of nitric acid and using a 10–115% excess of acetic anhydride over that necessary to react with the water formed in the reaction plus that present in the nitric acid. When acetic acid and nitric acid are used they are generally mixed at temperatures below 10° C. and the nitrations are carried out below 30° C. At the conclusion of the reaction, the mixture is poured into a large volume of water, the nitrated product separated and washed with water or alkali until freed from acid. (Curry and Mason, Journal of the American Chemical Society, vol. 13, 5043, 1951.)

The methods described in the prior art are not suitable for the economical production of these N-nitro compounds. The disadvantages are:

(1) the necessity of a large refrigeration capacity to keep the temperature of the mixing of acetic anhydride with nitric acid below 10° C. and the temperature of the nitration mixture below 30° C.

(2) the use of a large excess of nitric acid and a substantial excess of acetic anhydride, (3) the isolation of the N-nitro compound from the reaction mixture by pouring the reaction mixture into a large excess of water, thus eliminating the possibility of economical recovery of the acetic acid, (4) the formation of an undesirable by-product, tetranitromethane, formed as a result of a reaction between the excess nitric acid and acetic anhydride.

The most economical process is the one which corresponds most nearly to the stoichiometry expressed in the equation:

(1)
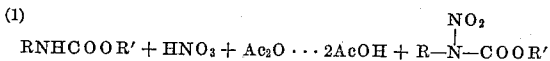
$$RNHCOOR' + HNO_3 + Ac_2O \cdots 2AcOH + R-\underset{|}{N}-COOR'$$

where R is a primary or secondary alkyl, aralkyl or cycloalkyl group, or hydrogen; R' is an alkyl, aralkyl or cycloalkyl group.

It is an object of the present invention to produce nitrated compounds of the type indicated, in a rapid, economical manner using the theoretical amounts of the reactants required.

It is a further object of this invention to produce a reaction mixture from which the solvent can be easily separated from the reaction product.

Further objects of this invention are to eliminate the necessity for expensive refrigeration equipment and to eliminate the formation of an undesirable by-product.

These and other objects have been realized by using one mole of nitric acid for each mole of carbamate used and using a slight excess of acetic anhydride over that required to react with the water formed in the reaction, plus the water present in the nitric acid, and conducting the reaction at a temperature in the range of 40° C. to 85° C. The maximum temperature permissible in any specific case is just below that at which appreciable decomposition occurs. Other acid anhydrides, such as propionic anhydride and butyric anhydride may be substituted for acetic anhydride.

The preferred order of mixing the reactants is to mix the carbamate with the acid anhydride and then to add the nitric acid to the rapidly stirred reaction mixture at such a rate as to maintain the desired reaction temperature. In view of the fact that fuming nitric acid oxidizes the nitrocarbamates readily, it is desirable not to pre-mix the nitric acid with the carbamate. If the nitric acid and the acetic anhydride are pre-mixed, the nitration should be carried out before appreciable amounts of the nitric acid react with the acetic anhydride to form undesirable by-products.

The reaction is carried out at temperatures above 40° C., and below that temperature at which the reaction mixture undergoes decomposition such as to destroy the product. The reaction temperature is maintained above 40° C. until the reaction is complete. It has been found that the temperature range permissible is broad, much broader than ordinarily expected in reactions involving mixtures of nitric acid and acetic anhydride where one is generally limited to temperatures below 40° C., in order to avoid a hazardous condition. The operation is successful in the case of the substituted carbamate at 70° C. and some reaction temperatures have gone as high as 85° C. during the addition of the nitric acid without any visible decomposition.

Esters of primary alkyl carbamic acids react vigorously and exothermically with the nitric acid, whereby considerable heat is evolved. These higher reaction temperatures mean that removal of heat may be accomplished much more simply than if the reaction conditions be constrained to 30° C. or below. Furthermore the evolved heat holds the temperature of the reacting mixture at a higher level so that the reaction will proceed more rapidly to completion. It is necessary to remove only enough heat to keep the reaction mixture from undergoing appreciable decomposition.

The more nearly the stoichiometry expressed in reaction (1) above, can be obtained and still achieve high yields, the less complicated the resultant reaction mixture and the more economical the isolation of the product and the recovery of the by-product, acetic acid. Thus the reaction mixture now obtained consists principally of the product, acetic acid, a small amount of acetic anhydride and a trace of nitric acid.

The most effective way to separate the product from the acetic acid is to remove the acid by distillation at reduced pressure. The temperature and pressure must be regulated so that most of the acetic acid is removed at the temperature used without extensive decomposition of the product. The product is then washed free of the last traces of the acid with water or with suitable amounts of a base. Acetic acid is recovered in an anhydrous state from the distillate and may be reconverted to acetic anhydride.

This invention makes it possible to produce N-alkyl nitrocarbamates by the use of high reaction temperatures and also provides for an efficient method of recovery of the by-product and for the isolation of the product. This process may be carried out as a continuous process; a two-step batch process; or a combination of the continuous process with a batch process. In the claims the word "process" includes both a continuous process and a batch process as well as a combination thereof.

In addition to the discovery that the nitration of N-alkyl carbamates proceeds in high yield with theoretical amounts of the reactants, it has been further discovered that the ease of nitration is a function of the nature of the N-alkyl group. Using identical experimental conditions and nitrating at 20° C., ethyl N-t-butyl carbamate gave a 55% yield, isopropyl N-isopropyl carbamate gave a 75% yield, and ethyl N-ethyl carbamate gave a 90% yield. Comparative experiments also showed that as good or better yields could be obtained using the theoretical (or a small excess) amount of nitric acid at an elevated temperature (above 40° C.) as could be obtained using a 50% excess of nitric acid at a lower temperature. Furthermore it should be pointed out that heating one of these reaction mixtures containing a 50% excess of nitric acid above 40° C. would cause oxidative decomposition of the nitrocarbamate.

The nitration of alkyl carbamates, wherein there are two hydrogen atoms attached to the nitrogen, proceeds readily in high yield when theoretical amounts of the reactants are used. In one case a yield of 96% was isolated. The reaction proceeds to completion at temperatures ranging from 0° C. to 50° C., the time of reaction being a function of the temperature, and the reaction being completed more rapidly than in the case of the N-alkyl compounds. In order to obtain these high yields among the lower molecular weight members such as urethan itself, it is essential to remove the acetic acid by distillation under sufficiently reduced pressure so that the product is not decomposed thermally. Thus in a two-step operation the esters of N-nitrocarbamic acid are now readily available.

The different methods of nitration have been shown to be effective using the esters of substituted carbamic acids, but it is apparent to any one skilled in the art that these same methods of nitration may be used on other materials.

*Example 1*

Two-tenths of a mole of ethyl N-ethyl carbamate was dissolved in 0.264 mole of acetic anhydride. To the rapidly stirred solution, 0.2 of a mole of 95% nitric acid was added in the course of three and one-half minutes, the reaction temperature rising to 60–70° C. The mixture was held at 60° C. for eleven minutes, and then poured into an equal volume of saturated sodium chloride solution. The product was washed free from acid with 20% potassium carbonate solution and dried over anhydrous potassium carbonate. A 97% conversion to the nitrocarbamate was obtained.

*Example 2*

Two-tenths of a mole of ethyl N-butyl carbamate was dissolved in 0.265 mole of acetic anhydride and nitrated as in Example 1, using 0.22 mole of 95% nitric acid at a temperature of 40–50° C. The nitric acid was added in the course of two minutes and the reaction mixture was then held at 40–50° C. for ten minutes. After separating the product, washing and drying, the conversion to the nitrocarbamate was found to be 98%.

*Example 3*

Two-tenths of a mole of isopropyl N-isopropyl carbamate was dissolved in 0.265 mole of acetic anhydride. To the rapidly stirred solution, 0.22 mole of 95% nitric acid was added in the course of four minutes, the reaction temperature being maintained at 50° C. by means of an external cooling bath. The reaction mixture was held at 55° C. for sixty minutes and the product was separated, washed and dried as in Example 1. The conversion to the nitrocarbamate was 98%.

*Example 4*

A mixture of nitric acid and acetic anhydride was made by adding 0.22 mole of 95% nitric acid to 0.265 mole of acetic anhydride at 20–30° C. Isopropyl N-isopropyl carbamate (0.2 mole) was added to this mixture at such a rate that the temperature was maintained at 25° C. by means of an external cooling bath. The reaction mixture was then heated to 50–55° C. and kept at this temperature for fifteen minutes. The product was separated, washed and dried as in Example 1. The conversion to the nitrocarbamate was 92%.

*Example 5*

To a mixture of 0.4 mole of ethyl carbamate and 0.54 mole of acetic anhydride was added in a period of 10 minutes 0.42 mole of 95% nitric acid. The temperature was maintained between 40° and 50° C., by controlling the rate of addition, and after the addition was complete, by means of an external heating bath. The reaction mixture was stirred for one hour. The acetic acid was removed by distillation at 20 mm. pressure, until the temperature of the residue in the pot reached 100° C. The residue weighed 50 g., melted at 63–64°, and was essentially pure ethyl N-nitrocarbamate. The yield was 93% of the theoretical.

*Example 6*

To a mixture of 0.328 mole of n-butyl carbamate in 0.43 mole of acetic anhydride was added 0.33 mole of 95% nitric acid in a period of four and one half minutes, the temperature being maintained at 55–65° C. by balancing the rate of addition against the cooling effect of an external water bath. At the end of the addition, the reaction mixture was cooled at 40° C. and let stand at this temperature for ten minutes. The mixture was poured onto 50 ml. of saturated sodium chloride solution and washed five times with saturated sodium chloride to remove the acetic acid. The product, dried over calcium chloride, weighed 48.5 g., 90% of the theoretical.

*Example 7*

To a mixture of 0.222 mole of n-hexyl carbamate dissolved in 0.29 mole of acetic anhydride was added 0.225 mole of 95% nitric acid in a period of fifteen minutes. The temperature was maintained at 10–20° C. by means of external cooling. The mixture was allowed to stand an additional fifteen minutes at 10° C. The reaction mixture was separated by distillation of the acetic acid and trace of acetic anhydride under reduced pressure, first at 20 mm. and at a maximum pot temperature of 100° C., and finally at 0.1 mm. at a maximum pot temperature of 100° C. The residue weighed 39.8 g. The yield was 95% of the theoretical.

*Example 8*

One mole of isopropyl N-isopropyl carbamate was mixed with 1.38 moles of acetic anhydride, and 1.037 moles of 95% nitric acid was added at such a rate, and with sufficient external cooling by means of cold water, as to hold the reaction temperature at 50–60° C. After all the nitric acid was added, the reaction mixture was held at 55° C. for one hour. The actic acid, small excess of acetic anhydride and the trace of nitric acid were removed by a continuous flash distillation process. The nitrocarbamate residue was washed with saturated salt solution and potassium carbonate solution until freed from the small amount of acetic acid. The nitrocarbamate layer was dried and a 94% yield of isopropyl N-nitro-N-isopropyl carbamate was obtained.

The most remarkable aspect of this invention is the fact that the mixtures of acetic anhydride and nitric acid are used at temperatures at which ordinarily these two reagents alone are considered dangerous. It is believed that the acetyl nitrate formed by the mixing of these two substances is not the actual nitrating reagent but that some intermediate is formed as the active ingredient. This intermediate is consumed by the carbamate before it can undergo autocatalytic side reactions which lead to rapid and sometimes even violent decomposition.

The conversion of these processes to a continuous process is considered to be obvious as are the techniques of distillation under reduced pressure and continuous flash distillation under reduced pressure.

The nitro compounds may be used as additives for hydrocarbon fuel, particularly diesel fuel and they may also be used as organic solvents.

The different methods of nitration have been shown to be effective using the esters of substituted carbamic acids, but it is apparent to any one skilled in the art that these same methods of nitration may be used on other materials.

What is claimed is:

1. A process for the preparation of a nitro derivative of an ester of a carbamic acid of the formula

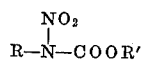

wherein R is a radical selected from the group consisting of primary alkyl, secondary alkyl, aralkyl, cycloalkyl and hydrogen, R' is a radical selected from the group consisting of alkyl, aralkyl or cycloalkyl; which comprises mixing equimolar amounts of a carbamic acid ester and nitric acid in the presence of a lower alkanoic acid anhydride, using enough anhydride to react with the water present in the nitric acid and with the water produced during the nitration; at a suitable temperature, above 40° C. except when R is hydrogen, but below that temperature at which the reaction mixture decomposes substantially; and removing therefrom the anhydride and the organic acid produced.

2. A process for the preparation of a nitro derivative of an ester of a carbamic acid of the formula

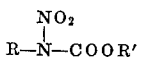

wherein R is a radical selected from the group consisting of primary alkyl, secondary alkyl, aralkyl, cycloalkyl and hydrogen, R' is a radical selected from the group consisting of alkyl, aralkyl or cycloalkyl; which comprises mixing equimolar amounts of a carbamic acid ester and nitric acid in the presence of a lower alkanoic acid anhydride, using enough anhydride to react with the water present in the nitric acid and with the water produced during the nitration; at a suitable temperature above 40° C. except when R is hydrogen, but below that temperature at which the reaction mixture decomposes substantially; the product being separated from the reaction mixture by removing the organic acid formed in the reaction, together with any excess organic acid anhydride and trace of nitric acid, by distillation under reduced pressure.

3. A continuous process for the preparation of a nitro derivative of an ester of a carbamic acid of the formula

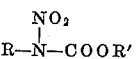

wherein R is a radical selected from the group consisting of primary alkyl, secondary alkyl, aralkyl, cycloalkyl and hydrogen, R' is a radical selected from the group consisting of alkyl, aralkyl, or cycloalkyl; which comprises continuously mixing equimolar amounts of a carbamic acid ester and nitric acid in the presence of a lower alkanoic acid anhydride, using enough anhydride to react with the water present in the nitric acid and with the water produced during the nitration; at a suitable temperature, above 40° C. except when R is hydrogen, but below that temperature at which the reaction mixture decomposes substantially; the product being continuously separated from the reaction mixture by continuously removing the organic acid formed in the reaction, together with any excess organic acid anhydride and trace of nitric acid, by distillation under reduced pressure.

4. A continuous process for the preparation of a nitro derivative of an ester of a carbamic acid of the formula

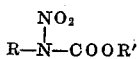

wherein R is a radical selected from the group consisting of primary alkyl, secondary alkyl, aralkyl, cycloalkyl and hydrogen, R' is a radical selected from the group consisting of alkyl, aralkyl or cycloalkyl; which comprises continuously mixing equimolar amounts of a carbamic acid ester with nitric acid in the presence of a lower alkanoic acid anhydride, using enough anhydride to react with the water present in the nitric acid and with the water produced during the nitration; at a suitable temperature, above 40° C. except when R is hydrogen, but below that temperature at which the reaction mixture decomposes substantially; the product being continuously separated from the reaction mixture by continuously removing the organic acid formed in the reaction together with any excess organic acid anhydride and trace of nitric acid, by flash distillation under reduced pressure.

5. A process for the preparation of a nitro derivative of an ester of a carbamic acid of the formula

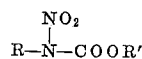

wherein R is a radical selected from the group consisting of primary alkyl, secondary alkyl, aralkyl, cycloalkyl and hydrogen, R' is a radical selected from the group consisting of alkyl, aralkyl or cycloalkyl; which comprises mixing equimolar amounts of a carbamic acid ester and nitric acid in the presence of acetic anhydride, using enough acetic anhydride to react with the water present in the nitric acid and with the water produced during the nitration; at a suitable temperature, above 40° C. except when R is hydrogen, but below that temperature at which the reaction mixture decomposes substantially; the product being separated from the reaction mixture by removing the acetic acid formed in the reaction, together with any excess acetic anhydride and trace of nitric acid, by distillation under reduced pressure.

6. A continuous process for the preparation of a nitro derivative of an ester of a carbamic acid of the formula

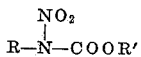

wherein R is a radical selected from the group consisting of primary alkyl, secondary alkyl, aralkyl, cycloalkyl and hydrogen, R' is a radical selected from the group consisting of alkyl, aralkyl or cycloalkyl; which comprises continuously mixing equimolar amounts of a carbamic acid ester and nitric acid in the presence of acetic anhydride, using enough acetic anhydride to react with the water present in the nitric acid and with the water produced during the nitration; at a suitable temperature, above 40° C. except when R is hydrogen, but below that temperature at which the reaction mixture decomposes substantially; the product being continuously separated from the reaction mixture by removing the acetic acid formed in the reaction, together with any excess acetic anhydride and trace of nitric acid, by distillation under reduced pressure.

7. A continuous process for the preparation of a nitro derivative of an ester of a carbamic acid of the formula

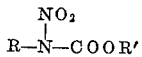

wherein R is a radical selected from the group consisting of primary alkyl, secondary alkyl, aralkyl, cycloalkyl and hydrogen, R' is a radical selected from the group consisting of alkyl, aralkyl or cycloalkyl; which comprises continuously mixing equimolar amounts of a carbamic acid ester and nitric acid in the presence of acetic anhydride, using enough acetic anhydride to react with the water present in the nitric acid and with the water produced during the nitration; at a suitable temperature, above 40° C. except when R is hydrogen, but below that temperature at which the reaction mixture decomposes substantially; the product being continuously separated from the reaction mixture by removing the acetic acid formed in the reaction, together with any excess acetic anhydride and trace of nitric acid, by flash distillation under reduced pressure.

8. A process for the preparation of a nitro derivative of an ester of a carbamic acid of the formula

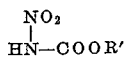

wherein R' is a radical selected from the group consisting of alkyl, aralkyl, cycloalkyl; which comprises mixing equimolar amounts of the said ester with nitric acid in the presence of a lower alkanoic acid anhydride, using enough anhydride to react with the water present in the nitric acid and the water produced during the nitration, at a temperature within the range of 0° C. to a temperature below that at which decomposition is initiated; and separating the product from the reaction mixture.

9. A process as claimed in claim 8, the product being separated from the reaction mixture by removing the organic acid formed in the reaction, together with any excess organic acid anhydride and trace of nitric acid by distillation under reduced pressure.

10. A continuous process for the preparation of a nitro derivative of an ester of a carbamic acid of the formula

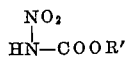

wherein R' is a radical selected from the group consisting of alkyl, aralkyl, cycloalkyl; which comprises continuously mixing equimolar amounts of the said ester with nitric acid in the presence of a lower alkanoic acid anhydride, using enough anhydride to react with the water present in the nitric acid and the water produced during the nitration, at a temperature within the range of 0° C. to a temperature below that at which decomposition is initiated; and continuously separating the product from the reaction mixture by flash distillation at reduced pressure.

11. A process as claimed in claim 8, wherein the acid anhydride is acetic anhydride.

12. A process as claimed in claim 11, the product being separated from the reaction mixture by removing the acetic acid formed in the reaction together with any excess acetic anhydride and trace of nitric acid by distillation under reduced pressure.

13. A process for the preparation of a nitro derivative of an ester of a carbamic acid of the formula

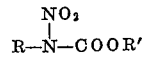

wherein R is a radical selected from the group consisting of primary alkyl, secondary alkyl, aralkyl and cycloalkyl, R' is a radical selected from the group consisting of alkyl, aralkyl and cycloalkyl; which comprises mixing equimolar amounts of a carbamic acid ester and nitric acid in the presence of a lower alkanoic acid anhydride, using enough anhydride to react with the water present in the nitric acid and with the water produced during the nitration; at a temperature above 40° C., but below that at which the reaction mixture decomposes substantially; and removing therefrom the anhydride and the organic acid produced.

14. A continuous process for the preparation of a nitro derivative of an ester of a carbamic acid of the formula

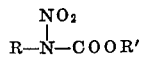

wherein R is a radical selected from the group consisting of primary alkyl, secondary alkyl, aralkyl and cycloalkyl, R' is a radical selected from the group consisting of alkyl, aralkyl and cycloalkyl; which comprises continuously mixing equimolar amounts of a carbamic acid ester and concentrated nitric acid in the presence of a lower alkanoic acid anhydride, using enough anhydride to react with the water present in the nitric acid and with the water produced during the nitration; at a temperature above 40° C., but below that at which the reaction mixture decomposes substantially; and continuously removing therefrom the anhydride and the organic acid produced.

15. A continuous process for the preparation of a nitro derivative of an ester of a carbamic acid of the formula

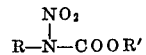

wherein R is a radical selected from the group consisting of primary alkyl, secondary alkyl, aralkyl and cycloalkyl, R' is a radical selected from the group consisting of alkyl, aralkyl and cycloalkyl; which comprises continuously mixing equimolar amounts of a carbamic acid ester and concentrated nitric acid in the presence of a lower alkanoic acid anhydride, using enough anhydride to react with the water present in the nitric acid and with the water produced during the nitration; at a temperature above 40° C., but below that at which the reaction mixture decomposes substantially; and continuously removing therefrom the anhydride and the organic acid produced by flash distillation.

References Cited in the file of this patent

Journal of American Chem. Society, vol. 73, 1951 (pp. 5043–5046), article by Curry et al.